(12) United States Patent
Cantal

(10) Patent No.: US 7,117,866 B2
(45) Date of Patent: Oct. 10, 2006

(54) MULTI-FACETED GRILL

(76) Inventor: Dante Cantal, 13231 E. 166th St., Cerritos, CA (US) 90703

( * ) Notice: Subject to any disclaimer, the term of this patent is extended or adjusted under 35 U.S.C. 154(b) by 261 days.

(21) Appl. No.: 10/929,592

(22) Filed: Aug. 30, 2004

(65) Prior Publication Data

US 2005/0051152 A1    Mar. 10, 2005

Related U.S. Application Data

(63) Continuation-in-part of application No. 10/383,160, filed on Mar. 5, 2003, now abandoned.

(51) Int. Cl.
*F24C 3/00* (2006.01)
*F24C 3/04* (2006.01)

(52) U.S. Cl. .............................. 126/41 R; 126/92 AC; 126/92 C

(58) Field of Classification Search ............. 126/41 R, 126/41 D, 41 E, 91 R, 91 A, 92 AC, 92 B, 126/92 C See application file for complete search history.

(56) References Cited

U.S. PATENT DOCUMENTS 5,129,312 A * 7/1992 Berger ...................... 126/41 R
5,598,769 A * 2/1997 Luebke et al. ................ 99/395

* cited by examiner

*Primary Examiner*—Alfred Basichas
(74) *Attorney, Agent, or Firm*—Maria Erlinda Co Sarno

(57) ABSTRACT

A grill having a top wall design incorporating a heat source that efficiently radiates heat towards the cooking cavity but allows the escape of flue gases and hot air towards the rear of the grill to protect the user. The grill has an access to the interior of the cooking cavity. In certain embodiments, a seating mechanism resides in the cooking cavity for accommodating a rack upon which food is placed and enabling the rack to reside on various levels. A rotisserie may be substituted for the rack. A control cavity in another embodiment may be used to house control mechanisms and electrical components sensitive to heat.

30 Claims, 9 Drawing Sheets

MULTI-FACETED GRILL

This application is a continuation-in-part of application Ser. No. 10/383,160 filed Mar. 5, 2003 now abandoned.

BACKGROUND

1. Field

The present invention relates generally to grilling systems, and particularly to a novel grill for cooking food efficiently, effectively, and safely, and for maintaining optimal flavor.

2. Background

Traditional outdoor grills are configured with heat sources residing below the cooking area. Heat sources herein refer to suitable heat emitting, gas and non-gas electrical sources and the like. One example is a simple charcoal grill. Such a grill contains a cavity in which charcoal is placed and ignited. This grill also contains a grate situated above the charcoal onto which the food is placed. A disadvantage of the charcoal grill is that food drippings generated from the cooking process fall into the cavity and ignite. The ignition of these drippings causes unwanted flames or flare ups to flow through the grate. These flames can scorch the food. Worse, the unwanted flames can pose a safety hazard to persons near the grill. Another example is a gas grill, where the charcoal is replaced by gas burners. Here, flare-ups from food drippings still present problems.

In many types of grills, including the charcoal and gas grill discussed above, the positioning of the cooking mechanism below the food creates other problems. Drippings and other by-products of the cooking process create a mess inside the cavity of these grills. For grills that use another type of burner such as an infrared burner, the drippings can clog the infrared device, requiring extensive and periodic cleaning. If left unchecked, the clogging can dramatically change the flame characteristics of the burner, producing undesirable emissions, unwanted temperatures or uneven hot spots. Eventually, the repeated flow of unwanted by-products onto the burner can result in permanent failure and the need for replacement. U.S. patent application Ser. No. 09/843,434 (Pub. No.: US2002/0157659A1 recognized the problem posed by a heat source residing below a cooking area by mounting a gas broiler above the cooking area. Additionally, to prevent the broiler flue products from entering the oven cavity or cooking area, a panel, transparent to radiation is placed beneath the broiler. While flue gases may be prevented from entering or circulating within the cooking area, this set up will allow residue from the vapors coming from the food to deposit on the surface of the panel facing the cooking area once the temperature falls below that required to fully burn the residue or vapors into the gaseous state. These deposits on the panel, if not cleaned immediately, will provide a breeding ground for microorganisms or more importantly, will affect the radiation transmission efficiency of the broiler.

Still other outdoor grills offer a rotisserie option, where the food is turned on a rotating spit. In one such system, an infrared burner is mounted vertically above the grilling surface and behind the food content. This arrangement results in the infrared flame being exposed forward toward the direction of the user. Hence, the burner releases high temperature and flue products towards the user. Obviously, this state of affairs can be highly undesirable. In a situation where the ignition is unpredictably delayed or the resulting flame is large in magnitude, the flame will move directly toward the unsuspecting user. Such a condition can produce a fire hazard and may even result in injury.

Moreover, in a traditional grill arrangement, the heat source generates juice originating predominantly from the bottom of the food content, where the heat source is closest. Gravity causes the juice to escape the food and drip into the cavity below. This arrangement can dry the food and deprive it of otherwise flavor-enhancing juices. Likewise, in a traditional rotisserie arrangement with the heat source located vertically behind the food content and rotating on a spit, the juice from the food will drip down below the rotating food and produce the same undesirable result.

With indoor grills where cooking is done in a sealed enclosed area, additional problems exist with the heat generated from cooking. In an outdoor grill, heat can be easily dissipated in the air. However, with indoor grills, the heat generated can overheat not only the inside but also the outside walls of the enclosure causing severe burns when accidentally touched from the outside which is currently prevented by heavy insulation between an inner wall and the outer wall which is costly and add unwanted weight to the grill, preventing it to be portable.

SUMMARY

This invention relates to a grill for cooking, comprising a cooking cavity of varying shapes having a top wall, side walls, a bottom floor and a front panel including an access means to the cooking cavity; a heat source mounted on the top wall for emitting radiant heat downwards toward the bottom floor, the heat source including a combustible surface continuously extending an angled proximal side of the top wall, the combustible surface situating at a distance from the front panel to allow escape of flue gases but prevent overheating of the side walls, bottom floor and front panel and surrounding areas of the grill; a rack configured for placement in the cooking cavity; and, a burner cavity housing the heat source, the burner cavity having a burner cover including a front, top and rear portion, the front portion having vents lower in position than vents on the rear portion of the burner cover to allow escape of hot air thereby cooling the burner cavity and maintaining the walls and interior of the grill within safety level. To achieve efficient cooking while diverting the heat from the side walls, bottom floor and front panel, the proximal side of the top wall should be angled between about 15 to about 50 degrees, preferably 30 to 45 degrees, facing the cooking cavity. About herein also means approximately. Further, the distance of the combustible surface from the front panel is recommended at about one inch to about four inches, preferably 1 to 3 inches on a proximal top wall panel angled between 30 to 45 degrees. The combustible surface aligns and fits into the top wall through a cut out on the top wall thereby continuously extending the angled proximal surface of the top wall and consequently tilting the heat source at an angle causing a front edge of the heat source to be below a back edge of the heat source. The top wall surface has an arching design facing the cooking cavity, with the angled proximal surface of the top wall below or lower than the rear top wall. The arching can be continuous or segmented. A rear top portion of the top wall can have a top rear panel having vents uncovered by the burner cover to allow smooth exit of flue products and other byproducts of the cooking process. The access means can be simply an opening cut out from the front panel leaving an open space. However, to keep the cooking cavity sealed, the access means could have a door and to be able to view the cooking cavity, the door can have a window. It is recommended to have a window that is removable for easy cleaning and to have the flexibility of either having an open front panel or a close front panel, as needed. Further, a window or a viewport that can slide in or out of the door through side door panels serving as tracks having a bottom panel border as stopper, facilitates the removal and introduction of the window or viewport. The stationary or removable viewport can also be installed on a stationary wall of the grill. A door that can slide or tuck into a bottom portion of the grill after it is opened, at a location parallel to the bottom wall allow easier access to the cooking area. The rack can be stationary or adjustable, that is, it can be raised or lowered relative to the heat source to control the heat emitted by the heat source on the content at the cooking cavity such as a food item on the rack without the need for readjusting a setting of the heat source. The heat source can be gas or non-gas driven or fueled. The grill can be configured as part of an island or it can be portable.

In yet another aspect of the invention, a rotisserie may be implemented in lieu of a rack with a seating mechanism. The position of the rotisserie inside the cooking cavity can be stationary or it can be adjustable. In this embodiment, a spit may be located at each end of the side walls of the grill. The mechanism for rotating the spit could fit well in a control cavity separate from the cooking and burner cavities.

The grill can include other features such as a control cavity to protect control components and portions of a venturi coupled to the heat source from adverse conditions and by-products generated in the cooking cavity, thereby ensuring proper functioning. The outlet of the venturi having an air inlet and an orifice for infusion of gases into the heat source is recommended to situate outside the burner and cooking cavity. The diameter of the orifice should be able to take different types of gases. The grill can have a drip pan to collect drippings generated by the cooking process. For quick firing, the heat source can be turned on by an igniter which can have reigniting ability, if desired. The grill can be made into a steamer by infusing water, solutions or juices, herein collectively referred to as liquid, into a side wall of the cooking cavity through a spray nozzle connected to a pressurized tank having a valve for opening or closing delivery of the liquid and for controlling the rate of delivery.

Other embodiments of the present invention will become readily apparent to those skilled in the art from the following detailed description, wherein it shows and describes only certain embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

Figure 1:
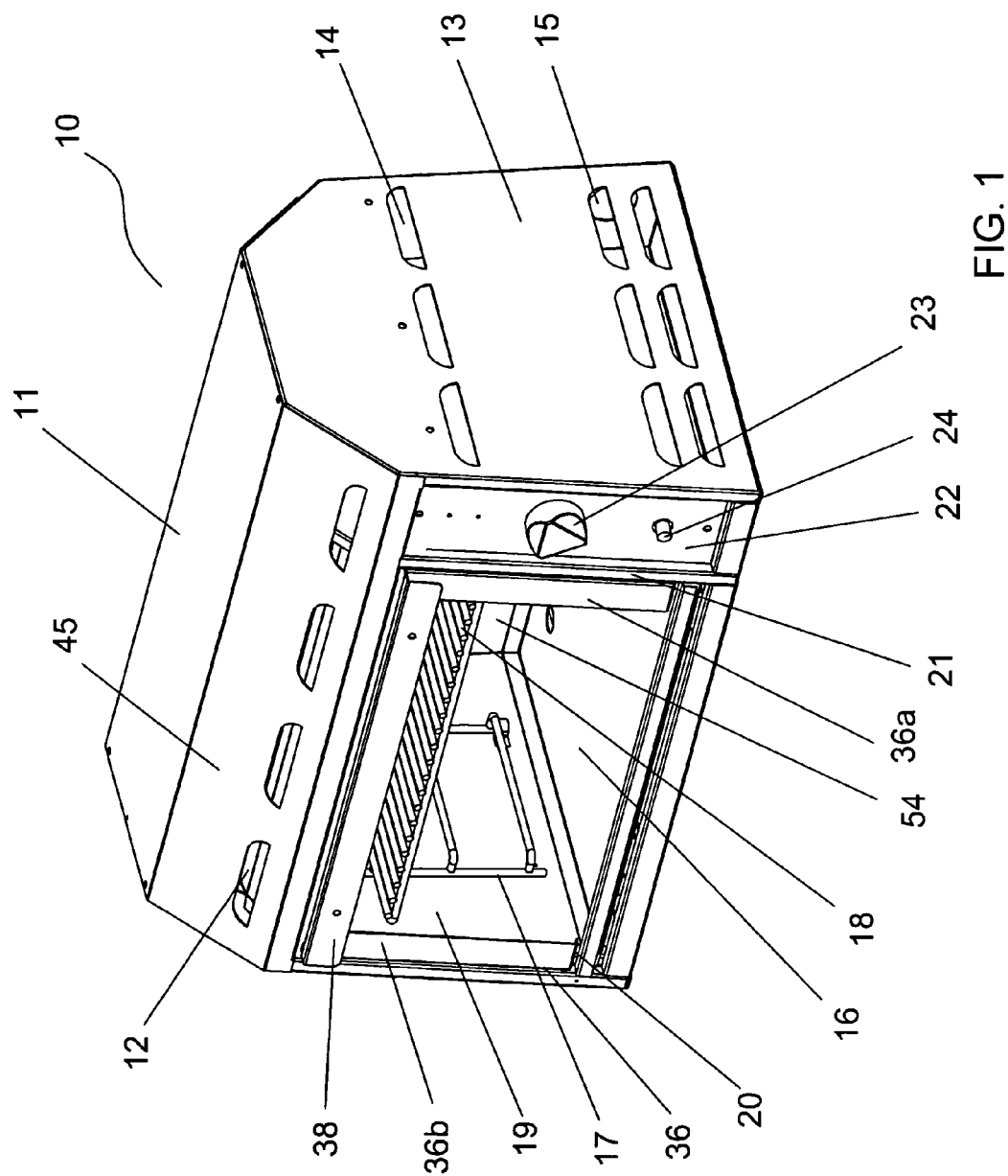
FIG. 1 is a drawing of an embodiment of the grill displaying the cooking cavity including the rack and seating mechanism.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention. In addition, for the purposes of this disclosure, the term "coupled" means "connected to" and such connection can either be direct or, where appropriate in the context, can be indirect, e.g., through intervening or intermediary devices or other means. Herein, the word panel includes or is part of the wall or is sometimes synonymous to the wall.

A grill 10 is disclosed in which the heat source 27 is mounted above the rack 18 for holding the food content. The heat source generates radiant heat to broil the food. In one embodiment, the food is enclosed within a cooking cavity 16, with a front door 20 available for food access. Moveable racks 18 may be used to maintain desirable cooking temperatures. Food is broiled in one aspect through radiant heat generated by a gas infrared heat source. The grill 10 of the claimed invention includes a cooking cavity 16, a burner cavity 55 and optionally but desirable, a control cavity 25.

Because the heat source is mounted above the food content, juice, grease, and other food drippings generated from the cooking process and collected below will not ignite easily. The occurrence of flare-ups associated with traditional grills, where the grease catches on fire and produces unpredictable flames, is largely eliminated. Moreover, the positioning of the heat source is above the cooking surface rather than below the food as in conventional outdoor residential grills. The position of the heat source above the food means that by-products from the cooking process will not clog the heat source. The positioning of the heat source also solves the potential hazards encountered in outdoor grill rotisseries where the burner is oriented in the direction of the user. Unlike those grills, the heat source is directed downward rather than towards the user, making the cooking mechanism safer for the user. However, mounting the heat source directly above the food source is not enough. A heat source directly above the cooking cavity have the tendency to heat the access door and without more, flue gases will tend to circulate around the cooking cavity. The heat source, therefore, has to be mounted on a top wall effecting a chimney effect to allow the escape of flue gases and prevent the overheating of the walls especially the front access door 20.

Mounting the infrared burner above the food content will generate juice on the top surface of the food. These juices remain within the food. They generally do not flow down and away from the food content. Thus, the present arrangement tends to "seal" the juice within the food content, enhancing the flavor and preserving the natural moisture within the food.

Figure 2:
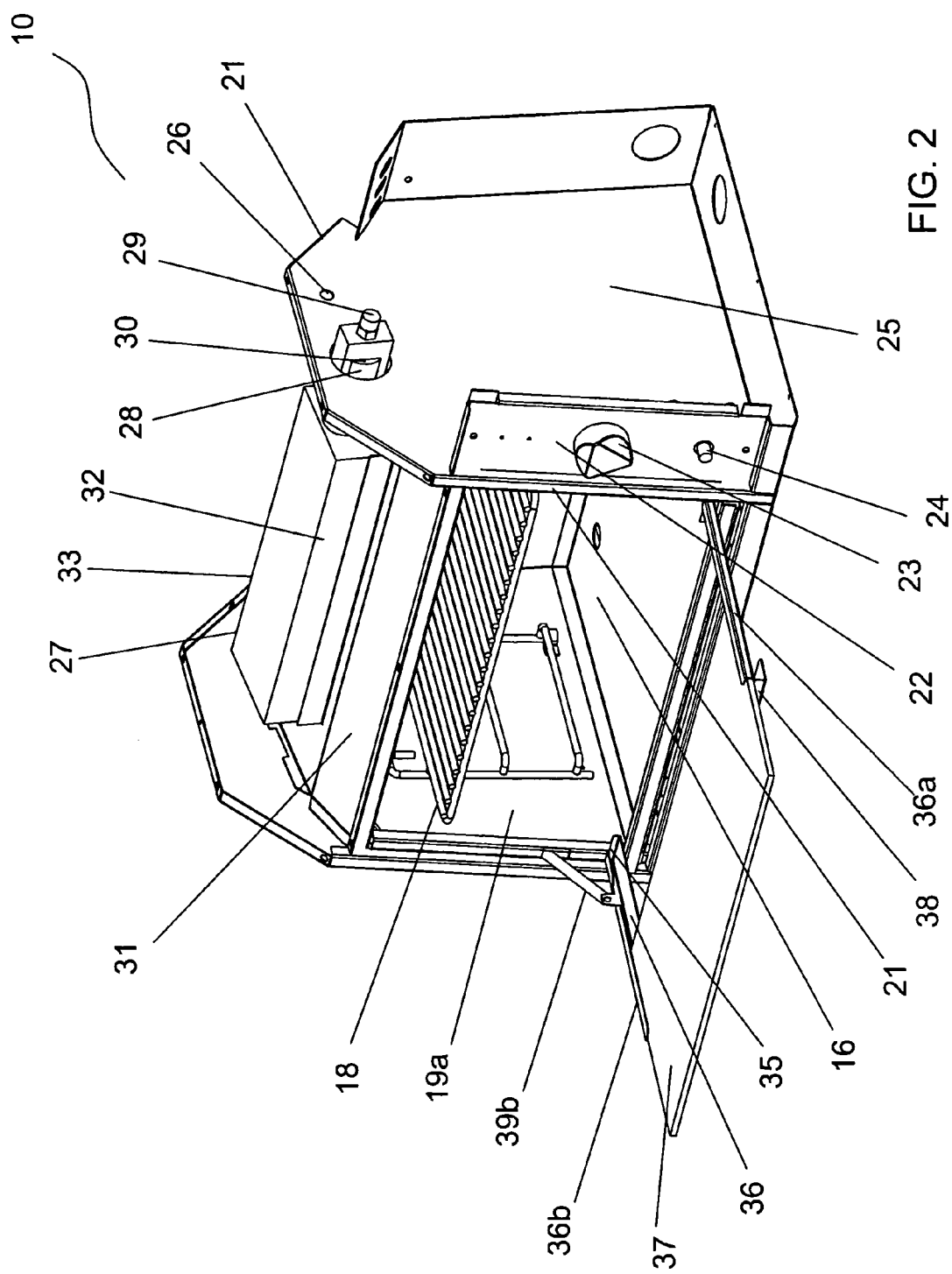
FIG. 2 is a drawing of an embodiment of the grill showing the control cavity and burner.

The embodiment in which multiple shelves (or multiple shelf inserts) or cooking racks 18 and multiple shelf or rack locations are used allows the user to adjust the cooking temperature by lowering and raising the food on the shelves, obviating the requirement in many cases that the user change the setting on the heat source such as for example, on the infrared burner or the gas pressure on a gas burner. In a gas burner, adjusting the parameter often results in unpredictable and potentially wider than desired variances in temperature. Traditional infrared burner mechanisms, on the other hand, typically require that the user adjust the cooking temperature by changing the BTU setting. These heat adjustment steps are often ineffective and produces unpredictable results affecting the quality of the cooked food. FIGS. 1 and 2 show the seating mechanism which enables the user to place the rack 18 in three distinct positions relative to the burner 27 but the number of racks is a matter of choice depending on various factors such as the volume of the cooking area or cavity, rate of cooking desired and other considerations. Most infrared burners do not perform optimally when adjusted below their designated BTU settings. Infrared burners can exhibit even more severe nonlinear operating characteristics when downward adjustments are made. Moreover, reducing the BTU setting of certain infrared burners below a threshold may well cause unstable flame characteristics, including flashback or extinction. Specifically, most infrared burners are designed with particular and often precise settings that help ensure optimal temperature settings and predictable well adjusted radiant heat properties. Because traditional grills lacking multiple levels require the modification of these settings where temperature adjustment is desired (e.g., by turning down the burner), a problem results when the burner is adjusted above or below its articulated design parameters—a frequent occurrence. The result (as noted above), is unpredictable heat and temperature characteristics that may vary widely from the desired adjustment, operational problems of the burner, or failure of the burner altogether. By contrast, the present embodiments enable the user to downward adjust the level of radiant heat on the food by simply lowering the shelf or placing the food onto a lower shelf. A seating mechanism 17 shown in FIG. 1 resides on a side wall 19 of the cooking cavity 16. Another seating mechanism (not seen due to the orientation of the grill 10 in FIG. 1) resides on the opposite side wall. In some, the seating mechanism is implanted via indentations or grooves in the side walls. The purpose of the seating mechanism 17 in one embodiment is to provide sets of rigid metal wires or wire racks to support the cooking rack 18.

The seating mechanism 17 provides, in one embodiment, multiple bar sets to accommodate support for the cooking rack 18 at different vertical levels within the cooking cavity 16 relative to the burner mechanism. Different rack levels correspond to the exposure of the food to different levels of radiant heat. The shelves are preferably but not necessarily removable when not needed. Removal allows more room for bulkier food items. This also allows one to easily clean the shelves between usage, if desired.

Much like a conventional oven, the cooking rack 18 is designed to support a food item that will be cooked in the grill 10. By using the seating mechanism 17 to vary the position of the rack 18, the user can effectively control the temperature to which the food item will be exposed. For instance, if the user changes the rack 18 to sit on a lower level supported by the seating mechanism 17, the food will be exposed to a lower intensity of radiant heat and will cook slower and at a lower temperature. Conversely, as the user places the rack 18 on the upper supports of the seating mechanism 17, the food item will be closer to the heat source and the effective cooking temperature will increase. The appropriate level(s) for cooking the food item depends on a number of factors such as the type of food, the desired temperature, the user's culinary strategy for cooking the food item, the power level of the heat source, amount of grilling time, and others. A notable advantage of the seating mechanism 17 in FIG. 1 is that it provides a more precise and predictable method to control the cooking temperature than grills in which the user need resort to changing the gas pressure.

FIG. 2 depicts an illustration of an embodiment of the grill 10. To assist in better understanding the functionality of the grill 10, not all of the components are precisely drawn to scale. Also, for clarity and to avoid unduly obscuring the grill 10 in FIG. 1, certain components are omitted from the figure. The grill 10 in this embodiment includes a door panel 36 with right and left door panel borders 36a and 36b, respectively. The door panel border 36b may be coupled to the corresponding hinge 39b. In this embodiment, the door panel borders 36a and 36b and the hinge 39b reside on front of the grill for easy opening and access to the food items. The hinge 39b is employed so that the door can be opened by pulling down the door handle 38, in the same fashion as in a traditional residential oven. Multiple hinges may be used if desired. Optionally, the door 20 after it is opened can be made to slide onto or tucked into a bottom portion of the grill 10, parallel to the bottom wall to allow easier access to the cooking area. The sliding mechanism is conventional.

Figure 7:
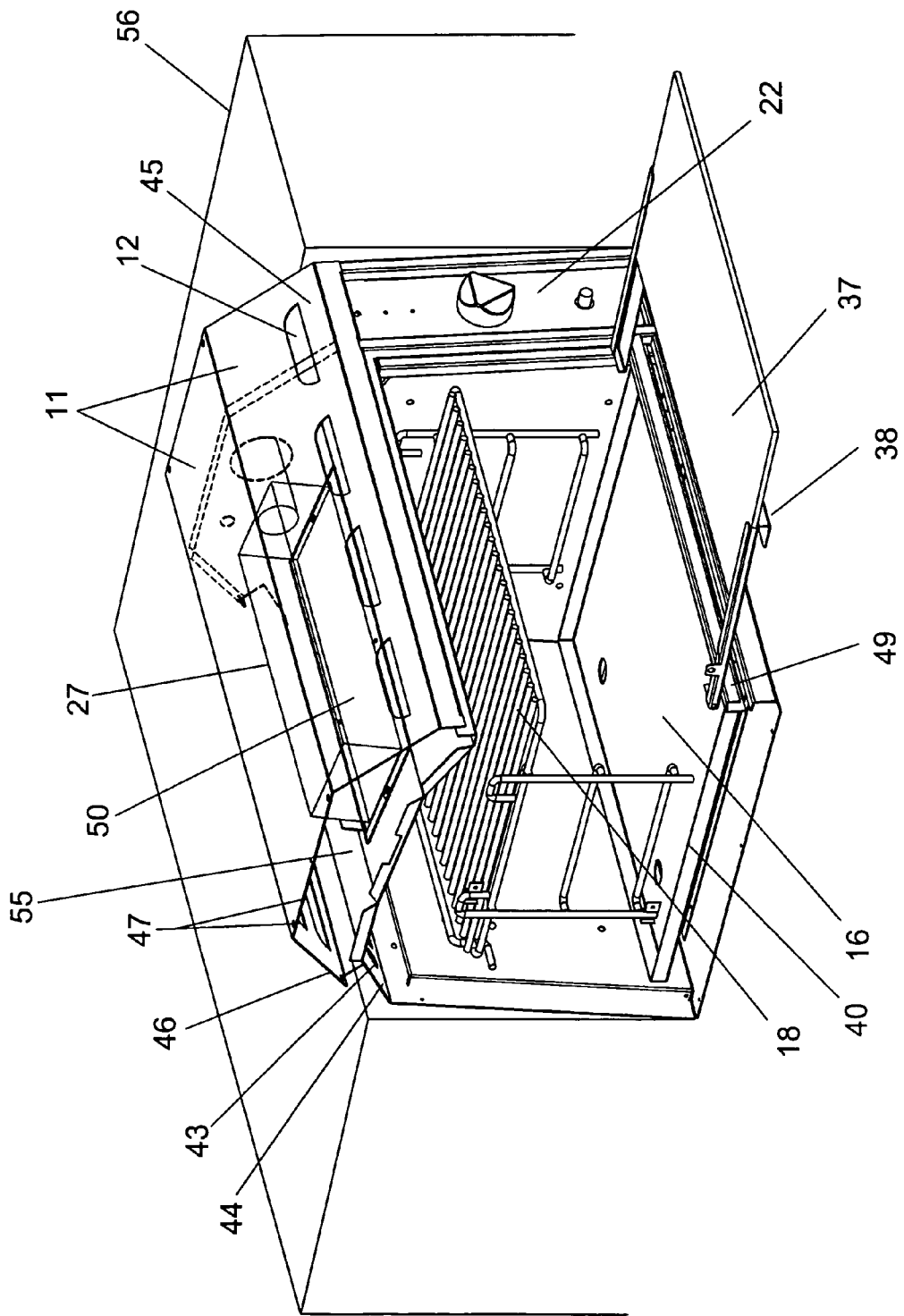
FIG. 7 is an angled view of an embodiment of the grill configured as part of an island with a side wall cut away to show the cooking and the burner cavity.

In one embodiment, the door panel 36 constitutes a window 37 for observation purposes. The window may be glass having the thickness and structural composition appropriate for use with the hot grill 10. The glass of the window has sufficient gradient resistance so that the temperature difference between the cooking cavity 16 and an area outside the window is within some acceptable standard of tolerance. Alternatively, the window 37 may constitute another transparent material provided that it meets or exceeds proper thresholds for withstanding the heat. The glass should contain sufficient thickness and insulation capability to maintain the heat at its exposed outer surface to within safety levels or otherwise within a suitable range to avoid dangerously high outer surface temperature levels. In yet another embodiment, a window is simply omitted or designed to be removable; that is, the side panel that forms the opening of the grill 10 consists of in whole or in part an access panel for the food with or without a viewport. A viewport or window 37 as shown in FIG. 2 that can be introduced or slid into and out of the door through the left and right door panel borders 36*b* and 36*a* having a track for the window and a bottom panel border 35 as a stopper to keep the window in place, much like the mechanism employed in introducing a glass or plastic cover on a picture frame, will provide the flexibility of omitting or removing the window at will. Additionally, a removable window will allow one to easily clean the window between usage. FIGS. 2 and 7 show the access door 20 with a removable window 37. For clarity and ease of illustration, the window 37 is omitted from FIG. 1, exposing the cooking cavity 16 and the rack 18 resting on a ledge in the cooking cavity. A viewport or window may also be installed on a stationary wall of the grill. The viewport can be stationary or removable, recommended to be slidable as the one installed on the door at the front panel. The mechanism for placing a slidable viewport on a stationary sidewall would be similar to the above, differing only in that the door incorporating the window described above opens and closes. The viewport on a stationary wall usually would be smaller than the window 37 shown in FIGS. 2 and 7. However, it should be appreciated that the viewport on the door at the front panel may not necessarily occupy the entire door space but it may also be a smaller window within the door, bordered on the sides by a non-transparent material.

In this figure, a cooking cavity 16 is formed in part by the front access panel wall 36 and the three interior walls that form the inside of the grill 10 (all four of which are also considered side walls, as explained further below). The four side walls and the bottom floor 41 form the lower portion of the cooking cavity 16. The bottom floor 41 consists of the surface (not seen) below the drip pan 40. The number of vertical side walls is usually determined by the number of sides of the grill 10. Thus, for example, in a four-sided grill such as grill 10 in FIG. 1, there are four vertical walls.

For purpose of this disclosure, a "side wall" is a substantially vertical (or in some embodiments it can include shapes or curves, etc. but is still ultimately situated in an up and down direction, and with two "side edges") Two or more side walls can be coupled together at the side edges to form an enclosure which, when coupled with a bottom floor and an appropriately designed top wall 31 (see FIGS. 5 and 5A), constitute a cooking cavity. As discussed in FIG. 1, three interior side walls and the front access door 20 (partially not shown) form the four side walls used in that embodiment. Although obscured by burner cover 11, the top cover or wall 31 with the integrated heat source, by virtue of its coupling to the top edges of the four side walls, form the cooking cavity 16.

Referring briefly back to the FIG. 1 embodiment, as mentioned above, the side walls are coupled to each other to form a substantially sealed enclosure that is used in the cooking cavity 16. For the purposes of this disclosure, devices are broadly considered "coupled" if they are connected or attached, whether directly or indirectly through one or more intervening components, or if they are designed to fit together or make contact to perform a collective function even though not directly attached, subject only to condition that the proposed broad definition cannot be construed to produce absurd or nonsensical results.

The coupling mechanisms take many forms. Two walls, for example may be welded together at two edges, or they may be connected in one place via tiny screws. Both are usually considered examples of direct coupling. In other cases, the side wall coupling may be implemented through appropriate cements or welding techniques to the application. One of many examples of indirect coupling are two walls connected together by a third wall which is sealed, attached or otherwise affixed to the two walls (e.g., through welding and screws). Those walls are "coupled" together.

In some embodiments, side walls are supported by other components. These may include panels, divider walls insulation, traditional hardware components, insulators covers, vents etc. Panels 42 may even overlay on the side wall to provide support or assist in temperature absorption. Side panels often exist in grill, some with vents for air circulation or temperature control. These components may provide a variety of functions, such as insulating the grill from heat, providing support for the side walls. Such components may be integral in various designs, providing support, durability, insulation, etc. Upon perusal of this disclosure, it will be apparent to one skilled in the art that such components can be deployed to facilitate grill operation in connection with the novel embodiments herein.

Depending on the embodiment, the side wall provides a role in or is used for, among other purposes: (i) to provide, together with the bottom surface 41 (below the drip pan in FIGS. 1 and 5) and top surface (see No. 31 in FIG. 2) a distinct cooking cavity dedicated specifically for radiant heat cooking, (ii) to define the interior volume, shape and size of the cooking cavity 16, (iii) to provide, in some embodiments, and potentially with other components, useful properties to the cooking cavity 16 desirable for radiant grills or that are appropriate for the embodiment (e.g., durability, certain heat reflection properties, dirt resistant surfaces, provision of vents, optimal reflection/absorbent properties to enhance cooking, etc.), (iv) to segregate the cooking cavity 16 from other areas in the grill or from the outside (including helping to separate the intense heat of the grill from areas outside the cavity, (v) to connect the side edges of each side wall to the corresponding edges of the side walls such that an enclosure is formed, (vi) to allow one of the side walls—usually (but not necessarily always) in the front of the grill 10—to provide access to and, in one embodiment, to provide a window in, that side wall. These considerations are but a few that may be considered in designing a grill such as in the embodiments of FIG. 1 or 2. While this list neither articulates the necessary requirements of the side walls nor sets forth the often intricate design considerations that can effect the cooking cavity design, it does provide insight into the potential flexibility and potential benefits of the cooking cavity 16. The precise design details that are ultimately chosen may, depending on the embodiment, produce a sophisticated and multi-faceted grill.

Depending on the design goals, the walls 19 and floor 41 can be constructed to define the volume and shape of the cooking cavity 16 to best suit the application. Factors that depend on the selected volume and shape (e.g., the heat density or requirements that maximize efficiency without significant performance sacrifices, etc.) may also be relevant. The top wall (seen, e.g., in numeral 31 in FIG. 2) play an important role such as, for example, selecting and incorporating a heat source 27 optimal for the volume and anticipated use of the grill, selecting a top configuration that includes angles to maintain and direct the heat from the user (see the below embodiment) without affecting the heat directed towards the food item, and directing the flue gases towards the rear of the top wall in a chimney effect without necessitating a fan as discussed below to drive the flue gases out of the cooking cavity 16 through the vents 43 shown in FIG. 6 among others.

As shown in FIGS. 1 and 2, as noted above, a first side panel is considered for purposes of this disclosure to include the front panel 36 and access door 20 (portions of which are door handle 38, door panel borders 36*a* and 36*b*, and the window 37 (omitted in FIG. 1). A second side panel may include the wall, which forms in part a second wall 19*a* of the cooking cavity 16. A third side panel 19*b* may include, for example, the wall (not shown) on the left side of the grill. A fourth side panel as shown in FIGS. 5A and 6 includes the rear wall 54 of grill 10. Thus, the lower portion of the cooking cavity 16 in this embodiment is formed by the four side panels or walls (or wall sets) and a bottom floor, each side panel coupled on each of its two vertical sides to two corresponding vertical sides of the other side panels. In certain embodiments, however, separate components may be used to couple together the walls and may provide critical support to one or more side walls. In such embodiments, such components may constitute a portion of the cavity, since they are part of the mechanism that couples the walls together. As will be known in the art, these components may be included to provide certain desirable attributes of the grill. Each side panels also is coupled at its lower horizontal bottom edge to a side of the bottom floor. Also, while four side panels are used in the embodiment of FIG. 1, this number in other embodiments may be greater or less than four.

In more sophisticated systems, the cooking cavity may be constructed with special bordering materials or may be designed with additional devices like fans inserted in the cooking cavity. Such enhancements in many embodiments result in increased energy efficiency, better tasting food, increased heat transfer characteristics, improved heat distribution, etc.

For example, an electric or battery powered fan (not shown) may be situated in the grill 10 to move the hot air so that it spreads substantially evenly throughout the cooking cavity, potentially resulting in more even cooked and tastier food. Certain materials in the cavity walls may themselves provide still further benefits, such as walls that maximize the retention of heat thereby enhancing efficiency, or walls that cause reflections of heat waves to expedite the cooking process or change the cooking characteristics. Choosing stronger cavity materials may add strength and durability to the grill, if so desired. Further, the inner walls assist (usually in conjunction with other walls and components in the grill) in separating the high temperatures in the cooking cavity from external sources. Accordingly, sensitive materials and circuitry outside the cooking cavity are less apt to overheat.

Obviously, the benefits of implementing a grill according to the embodiments herein are numerous. Substantial benefits and efficiencies, and decreased danger of burns due to heat that substantially remains within the cavity, as well as the cooking benefits of radiant heat that is confined to the cavity, thereby enabling the application of heat to the entire food item are achieved. These benefits stand in stark contrast to traditional grills without enclosures to maintain an evenly cooked food product and with potential fire or burn hazards, etc.

Figure 5:
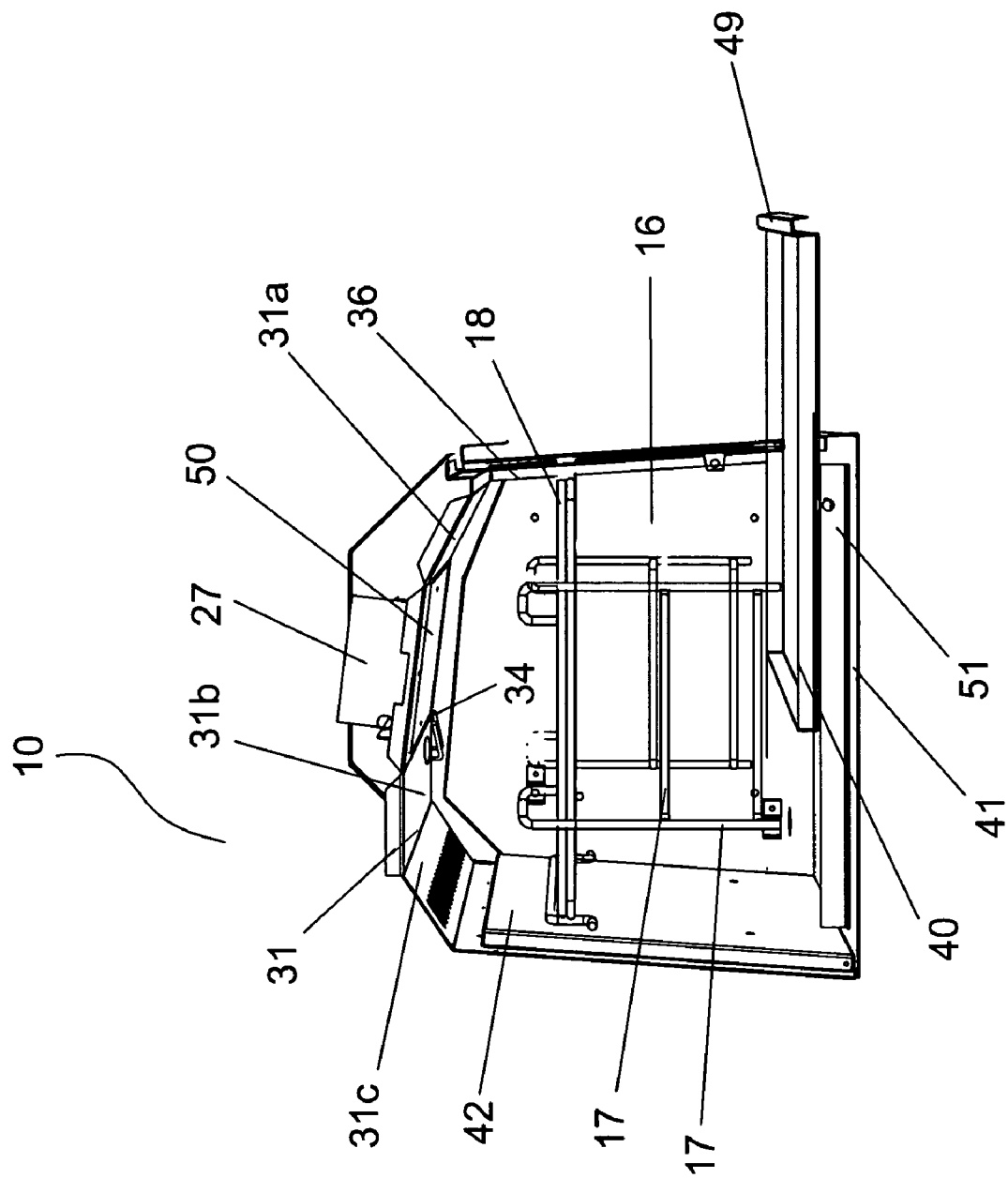
FIG. 5 is a side view of an embodiment of the grill without a side wall showing a pulled out dripping pan and a seating mechanism for supporting the rack.
Figure 5A:
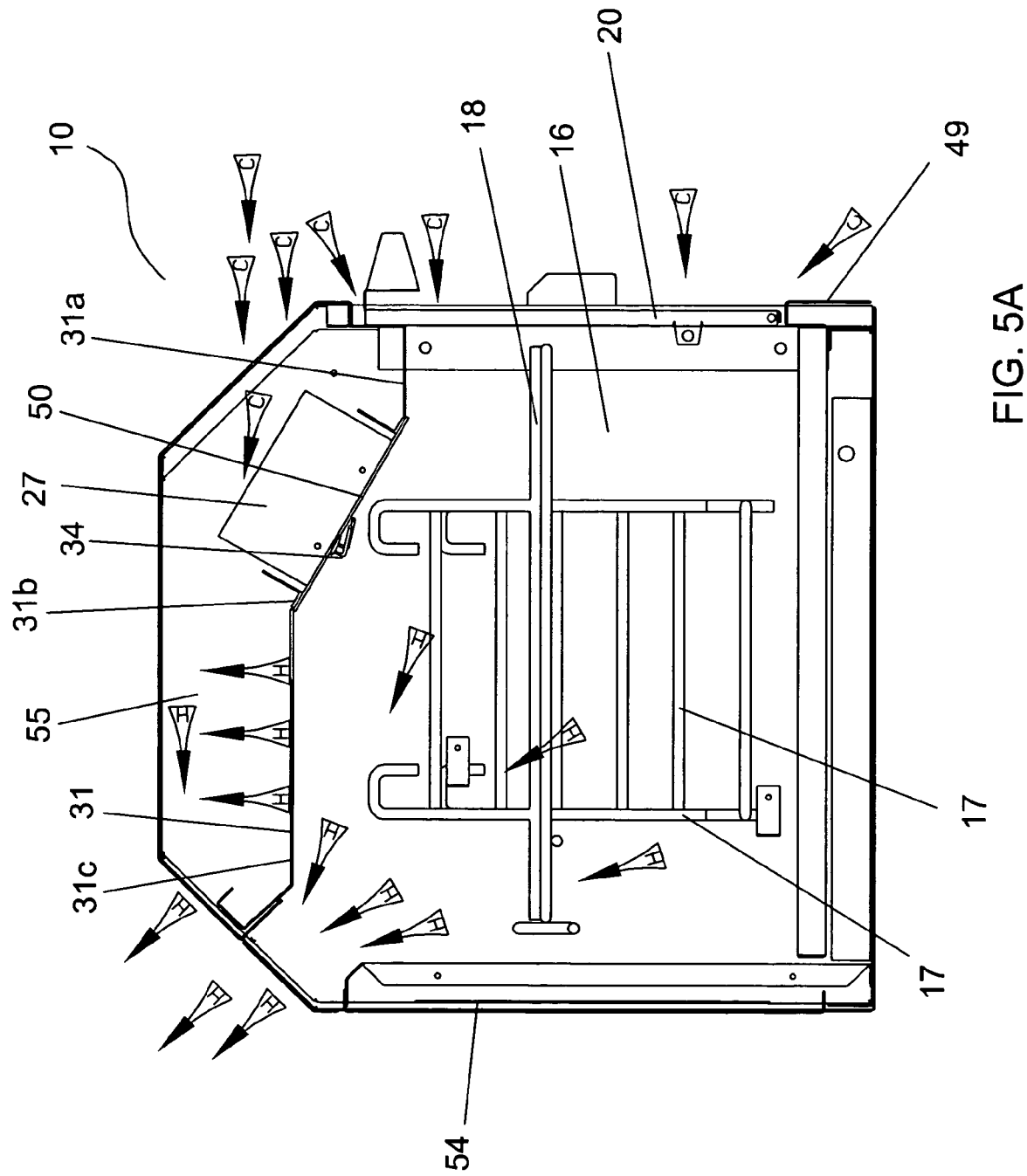
FIG. 5A is a side view of an embodiment of the grill without a side wall showing a proximal top wall having an initial flat section before tilting to an angle facing the cooking cavity and a detail of the gas and air flow in and out of the grill.
Figure 6:
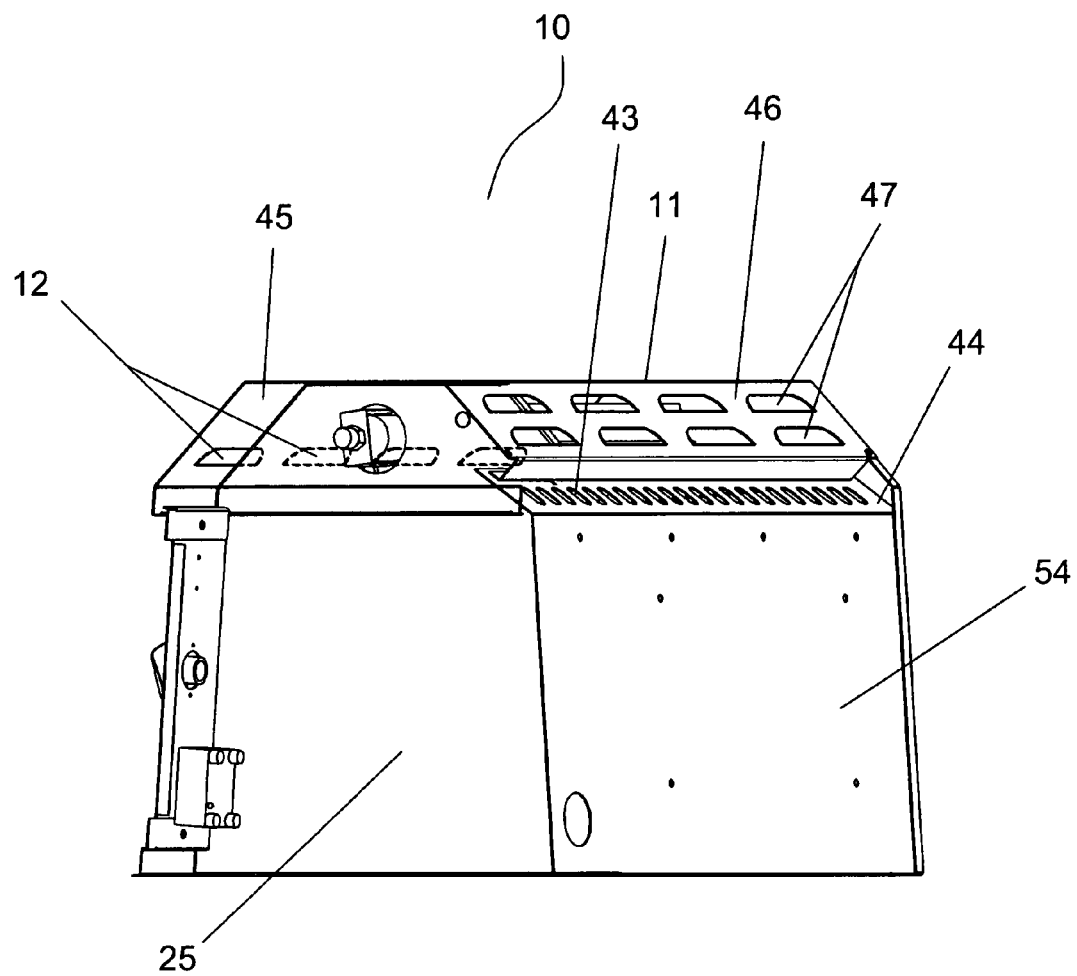
FIG. 6 is a rear view of an embodiment of the grill showing portions of the top panel and the control cavity.
Figure 8:
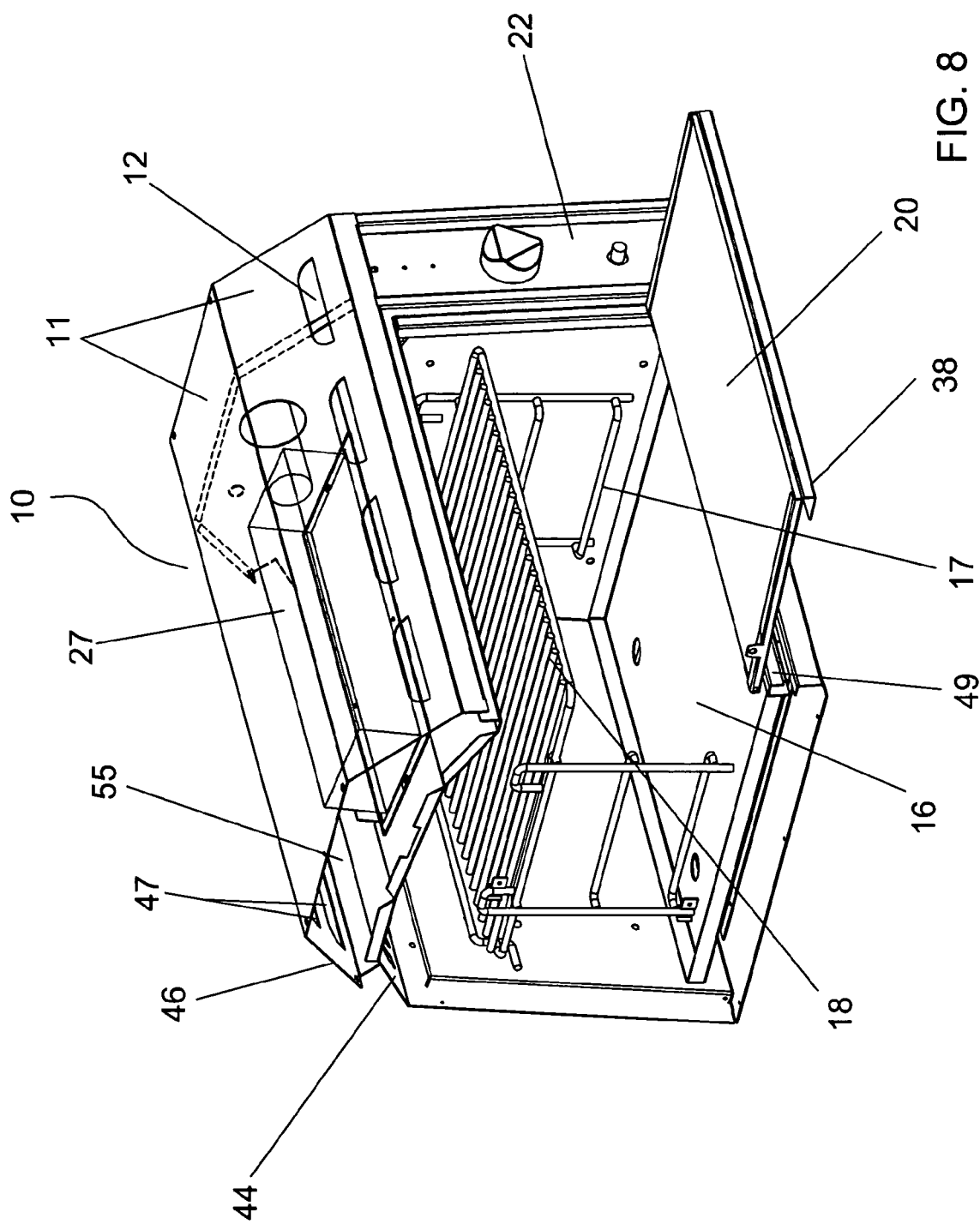
FIG. 8 is an alternative embodiment of a stand-alone grill with a side wall cut away to show the cooking and the burner cavity.

On the ceiling of the cooking cavity 16, a heat source 27, such as an infrared burner (not seen in FIG. 1), herein at times simply referred to as burner, resides in accordance with one embodiment, with its combustible media 50 facing downward toward the cooking cavity 16 as shown in FIGS. 5 and 5A. An angled burner cover 11 fits neatly over the burner 27 (see FIGS. 1 and 2) in grill 10. The burner cover 11 helps protect the burner mechanism from exposure to foreign particles. The burner cover 11 also helps protect the user from accidental exposure to or contact with the heat. High temperatures are generated by the underlying burner. Vents 12 allow air external to the grill to cool the area inside the burner cover 11 and burner 27, herein referred to as burner cavity 55 which is detailed in FIGS. 7 and 8. (In FIG. 1, a total of four vents exist on the front portion of the angled burner cover 11). To produce a chimney effect, that is, displacing the hot air from the heat source with external cool air entering through vent 12, the position of vent 12 at the front portion 45 of the burner cover 11 in relation to vent 47 is critical. Vent 12 should be lower in position than vents 47 located at the rear portion 46 of the burner cover 11 as shown in FIGS. 7 and 8. Vents 47 (similar in function and purpose to vents 12 in FIG. 1) provide an outlet for the transfer of heat from the burner cavity to cool the burner cavity and also, for example, maintain the walls and interior within safety requirements.

Figure 3:
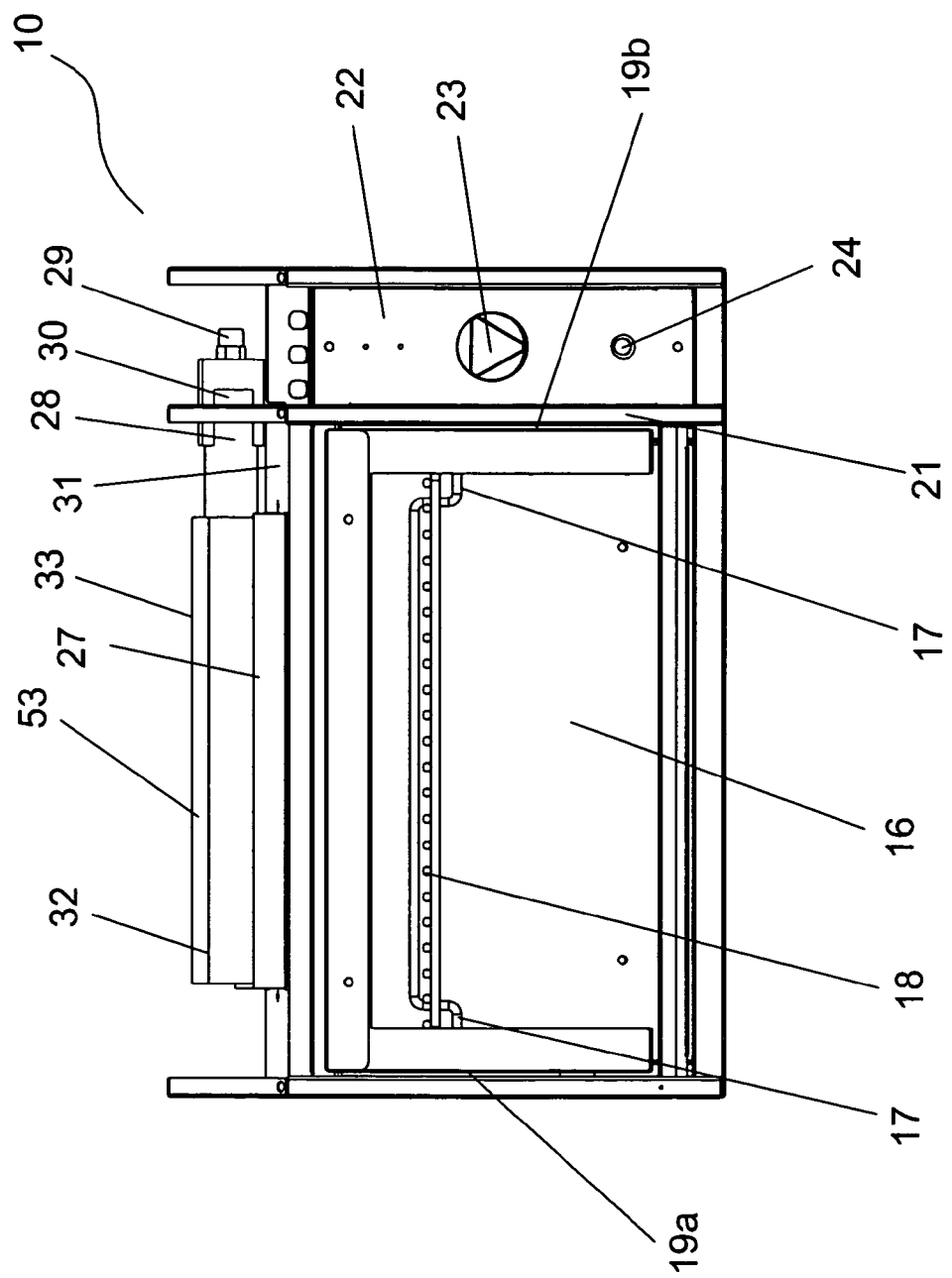
FIG. 3 is a drawing of a front view of an embodiment of the grill, minus the burner cover and portions of the access door.
Figure 4:
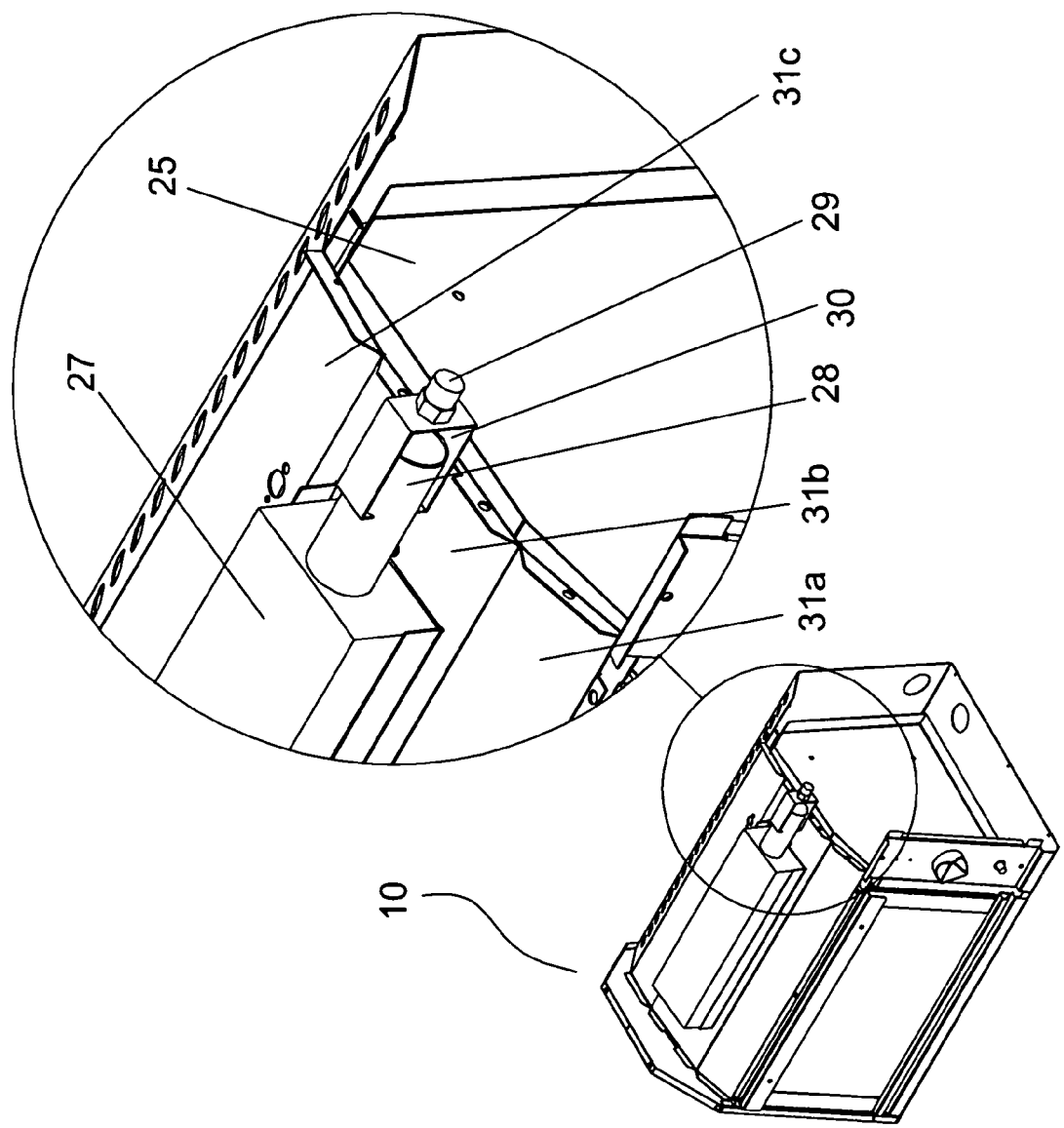
FIG. 4 is a drawing of a close-up view of an embodiment of the venturi and burner inlet.

In an example of a grill shown here, a control cavity (25 in FIG. 2) resides directly behind the control panel 22 and to the right of dividing wall 21. Alternate placements are also possible. The control cavity 25 provide a novel and convenient method for the placement of components used in the operation of the grill 10. A control cavity side panel 13 contains vents, for example, a set of three vents (or louvers) 14 and another set of six vents 15 to allow the passage of air to and from a control cavity 25 which is adjacent to the cooking cavity 16. The number, size and shape of the vents in the control cavity as well as elsewhere in grill 10 are at the discretion of the manufacturer, driven mostly by pattern of the air flow, safety and temperature requirements. Desired safety temperatures can be maintained by using the vents 12, 14 and 15. Vents 47 on the opposite rear portion of the burner cover 11 may also be used to maintain the walls of grill 10 within safety requirements. In other embodiments, insulation may also be used to accomplish this goal. The dividing wall 21 protects the components contained within the control cavity from adverse conditions and by-products such as heat and flue products generated in the cooking cavity 16. The control cavity 25 in this embodiment is much smaller in volume than the cooking cavity 16. The control cavity is vented properly so that the operating temperature remains appropriate for the proper functioning of the control components within the control cavity. FIG. 1 shows vent sets 14 and 15. The control components may, for example, include a gas valve coupled to control knob 23 to regulate the amount of gas entering the burner, electrical components used for flame ignition, a manifold used to connect the gas valve to a gas source, etc. The control cavity may also contain elements such as a battery to power the igniter. The control cavity may also contain portions of the venturi 28 as shown in FIGS. 3 and 4. The venturi, as will be discussed, is a component of the burner that provides for the flow of gas and air into the burner enclosure to enable combustion. The venturi includes an outlet that provides openings to accommodate the input of air and gas. Placing the outlet of the venturi in the control cavity avoids flue products and grease in the cooking cavity 16 from entering the outlet of the venturi, preventing an undesirable recirculation of emission. The control panel 22 associated with the control cavity contains a knob 23 which controls the gas pressure fed to the burner (see FIG. 2). The gas valve (not shown) referenced above and located in the control cavity is used to turn on the gas. The knob 23 further enables a user to control the pressure of the gas, and hence control the volume of the gas flow. The button 24 beneath the knob 23 in this embodiment is used for igniting the gas. In one embodiment, the button 24 is adjacent to a battery (not shown) located in the control cavity. The battery may be configured to provide a source of electrical power to the igniter 34. In other embodiments, a battery is not used. For instance, the igniter may be powered via a direct electrical connection to a wall socket. A piezo, rotary, or other type of igniter may also be implemented. Additionally, a hot surface type igniter may be implemented in lieu of a direct spark igniter. In still other instances, ignition may be manual, eliminating the need for electrical ignition circuitry.

In embodiments where gas is used to power the grill, the type of gas can vary. For instance, the grill 10 may be designed to accommodate natural gas, liquid propane ("LP"), and butane, among others.

An orifice (not shown) may be used in some embodiments to drain the grease and other cooking by-products from the cooking cavity 16. Further, a drip pan 40 may reside in the bottom of the cooking cavity 16. Juice, grease, and any other dripping product generated by the cooking process may be collected. The drip pan 40 is constructed preferably but not necessarily, to roll in or out of the grill 10 by rails 51. The drip pan 40 may be detached from the grill 10 by pulling on the drip pan handle. The drip pan 40 may be cleaned on a periodic basis.

FIG. 2 is an alternative view of an embodiment of the grill 10. The side panel 13 (FIG. 1) is removed so that the control cavity 25, separated from the cooking cavity 16 by the divider 21, may be seen. The burner cover 11 is also omitted from this illustration so that the configuration of the heat source, burner 27, according to an embodiment can be seen. The burner 27 will be discussed in greater length below. A venturi 28 can be shown, which allows the injection of air and gas to flow into the burner cavity as referenced below. While the venturi 28 is an essential part of the burner—and is so considered for purposes of this disclosure—the functionality of the venturi 28 will be separately discussed below. It can be observed that burner 27 is tilted at a slight angle, with the rear side 33 of the burner slightly higher as shown in FIG. 2. This angle provides significant benefits.

The grill 10 in FIG. 2 is oriented at a tilted angle with a predominantly side view and partial front and top views. The divider 21, control panel 22, control knob 23, and igniter button 24 are readily viewable in this illustration. Hole 26 is used for the introduction of the igniter (not shown) to feed through to a location proximate to and underneath the burner 27. In this embodiment, the heat source is an infrared burner 27 which contains rectangular metal side walls 32 and 33, and a metal top cover 53 as shown in FIG. 3. The underside of the burner 27 (i.e., that portion of the burner 27 facing down and toward the cooking cavity 16) contains the combustion media 50 shown in FIGS. 5 and 5A. While any suitable type of combustion media can be used in conjunction with the infrared burner, ceramic tiles are utilized as an example herein. Once ignition of the air and gas mixture originating from the venturi 28 is accomplished as described in greater detail below, radiant heat waves at an infrared wavelength are emitted from the ceramic tiles and into the cooking cavity 16.

While the embodiment of FIG. 2 is being described herein in the context of an infrared burner emitting radiant heat, it will be appreciated that other heat sources may be used without departing from the concepts of the invention. Such other heat sources may include, by way of example, non-gas electrical sources or other suitable heat-emitting devices that would be contemplated by those skilled in the art upon perusal of this disclosure.

The burner 27 as shown in FIGS. 2, 3, 4, 5, 5A, 7 and 8 is incorporated into the top wall or top surface 31, which separates the cooking cavity 16 from the burner cavity 55. As shown, the lower surface of the combustible media that constitutes part of the burner 27 is in substantial horizontal alignment with the top wall 31. The top wall or panel 31 covers the cooking cavity. The configuration of the top wall or top surface 31 is critical. As shown in FIGS. 2, 4, 5, 5A, 7 and 8, the front or proximal portion of the top wall or surface 31, herein also referred to as proximal top wall panel 31a rises at an angle. The angle can range from about 15 degrees to about 50 degrees. For a typical sized indoor grill, the top wall is recommended to rise at an angle between 30 and 45 degrees then gradually slope upwards such that the rear portion, herein also referred to as rear top wall panel 31c, terminates at a higher location compared to the proximal top wall panel 31a. A difference between FIGS. 5 and 5A is on the design of the proximal top wall panel 31a. On FIG. 5, the angle start almost immediately after the front wall or the door panel 36. On FIG. 5A, the proximal top wall panel 31a is initially flat before it starts to angle upwards. Both design equally works. The heat source, burner 27, is incorporated or mounted between the proximal top wall panel 31a and rear top wall panel 31c. As shown in FIG. 3, the burner 27 does not run the entire length of the cooking cavity 16. Since the top wall or surface 31 slopes or tilts upwards towards the cooking cavity, the burner 37 tilts upwards as well at the same direction as the top wall or surface 31. The front edge 32 of the burner 27 is slightly below the back edge 33 of the burner as shown in FIG. 3. The angled configuration of the burner 27 and the top wall 31 assist in keeping the flue products generated from the infrared combustion process, to flow easily towards the rear of the burner cavity 55 and cooking cavity 16 away from the user (operating the grill 10 from the access panel), and through the vents 43 in top rear panel 44 at the rear top wall panel 31c of the unit. The top rear panel 44 as shown in FIG. 6 provides a series of vents 43, in the form of a series of slits parallel to each other which are not covered by burner cover 11 to allow the smooth exit flow of the flue products, spent hot air and other by-products. With the principle that heat tends to rise, a "chimney" effect is created that generates an effective flow pattern for the flue products to exit away from the user. The size of the slits 43 in the top rear panel 44 depend on the amount of flue products generated in a given application. Furthermore, the proximal top wall panel 31a is angled towards the cooking cavity as stated above to minimize the exposure of the user to heat from the grill 10 when the front door 20 is opened. The angle of the proximal top wall panel 31a helps protect the user from exposure to the potentially extreme heat of the grill 10. The heat is essentially maintained in the interior of the grill, with unwanted by-products moving away from the user through vents (or slits) 43. Likewise, the upward angled top panel incorporating the burner, herein referred to as mid top wall panel 31b, shown in FIG. 5, is designed in accordance with the principle of heat rising. The upward angle assists in eliminating obstructions to the flow of flue products through vents 43. The function of this panel 31b assists angled ceramic tiles 50 to maintain heat away from the user by directing the radiant heat slightly inward (due to the angled ceramic tiles 50) and by providing a clear path for the exit of by-products through vents 43, and out of the grill 10 in a direction away from the user. The angling of both the top surface and the burner is therefore responsible for directing the heat downwards to the food item but away from the access door, thereby making it safer for the user. The distance between the door panel 36 and the angled burner 27 is critical. This should be at about or approximately one inch to about or approximately three inches for a top wall that is angled between 30 to 45 degrees to keep the heat radiation away from the access door or door panel. The distance of the angled burner from the front door is related to the angle of inclination of the proximal top wall and therefore would change with a change in the degree of inclination of the proximal top wall. FIG. 5A shows the direction of air flow with the disclosed design. Arrows with 'H' represent hot air while arrows with 'C' represents cool air. One means to achieve the desired arching of the top wall 31 is to divide the top wall into the three panels, 31a, 31b, and 31c as shown in FIG. 4. The center segment or mid top wall panel 31b is configured to accommodate the burner 27. As such, the surface of the center or mid panel 31b configured facing the cooking cavity, includes the surface of the ceramic tiles. The mid panel 31b may be cut to incorporate the insertion of the burner. As can be seen from FIG. 2, the top wall 31 and the burner 27 situated in the burner cutout form are removable, but in ordinary operation, are coupled to the side walls of the grill (FIG. 1) the bottom edges of which are coupled to the bottom wall, directly or through other components. The top wall 31 may also be made out of a single metallic sheet bent to form the necessary segments or panels or simply continuously arched according to the disclosed angle above. It is important to note that the degree of the angle disclosed herein, although a critical factor, may vary if the overall design or shape of the cooking cavity 16 varies from a substantially four sided cavity such as a square or a rectangular configuration. This angle can also change for grills with a large cooking cavity, especially where the racks may not be located at the center of the cooking cavity. What is important is for the proximal top wall panel to slope upwards then arch towards the cooking cavity, with the heat source incorporated or mounted at the upward sloping section of the top wall 31. In the example shown here, the proximal top wall panel 31a may be angled or sloped from the top of the door panel 36 as shown in FIG. 5 or it may be initially flat before sloping upwards as shown in FIG. 5A.

In one embodiment, the burner cover 11 (FIG. 1) and the top panel 31 are turned at substantially the same angle relative to one another. That is, they are substantially parallel, with the exception of the burner 27 itself, which in this embodiment fits into the top wall 31 via a "cut out" for the combustible media. This set up and design will necessitate a burner cover 11 with a slanted top due to the arching design of the top wall 31 which is critical to the claimed invention. A burner cover with a flat top as shown in FIG. 1 is, however, more practical and more cosmetically acceptable and will not materially affect the intent and purpose of the burner cavity 11. The replacement of hot air in the burner cavity 55 with the external cool air coming from the vents 12 on the front or proximal end 45 of the burner cavity 55 is achieved so long as proper distance is maintained between the burner 27 and the burner cover 11, seriously considering the arching configuration of the top wall 31 which is a vital aspect of this invention. The cool and hot air will easily flow from their respective origins, through the burner cavity 55, around the heat source or burner 27, and into the outlet vents 47 on the rear end 46 of the burner cover 11 which is located higher than the inlet vents 12 as shown in FIGS. 6, 7 and 8. FIG. 5A adds detail on the flow of air and gases through the burner cavity and the cooking cavity which although described, is not shown in FIGS. 5 and 7.

A visible portion of a venturi 28 is considered herein as a portion of an infrared burner generally and for this disclosure, a separate discussion of venturi 28 is also provided. The venturi 28 in this implementation is configured to collect a controlled air and gas mixture and thereupon provide the mixture to the burner 27 for use in the combustion process. Although not viewable in FIG. 2, the venturi 28 in one embodiment is attached to one side of the burner enclosure 27. FIG. 4, shows a close up and angled view of the grill with the wall 13 removed to provide a "zoomed in" view of the venturi 28. The venturi 28 includes an inlet port 30 through which air from the control cavity 25 is received. Gas is also injected into the venturi 28. To enable the injection of gas, the venturi 28 may also include an orifice 29. The orifice 29 is designed with an appropriate diameter to accommodate a range of possible gas flow rates. The orifice 29 in this embodiment is coupled to a gas source via a tube (not shown) of suitable diameter and thickness in light of the necessary pressure range. Gas may flow into the venturi 28 from a tank typically situated in an area external to the grill 10. The tank in this embodiment is coupled to the orifice 29 on the venturi 28 through the tube. Gas and air (the air through inlet 30, the gas through orifice 29) enter the burner 27 from the outlet of the venturi 28. The position of the primary air inlet 30 to the venturi 28 and the orifice 29 extend outside of the area above the cooking cavity 16, that is, in the burner cavity 55, and into the control cavity 25 to the right of divider 21 as shown in FIG. 3. As noted, this arrangement prevents flue products generated in the cooking cavity 16 as a result of the cooking process from recirculating back into the venturi 28. This positioning of the components consequently avoids the problem of progressively poorer emission. Further, the arrangement in this embodiment ensures that the temperature of the venturi 28, inlet 30 and orifice 29 remains cool relative to the cooking cavity 16. As such, flashback at the inlet 30 is avoided.

Through the combination of the air inlet port 30 and the orifice 29, a mixture of gas and air flows through the venturi 28 and into the enclosed burner 27 for use in the combustion process. As an illustration, a user in one embodiment inserts the rack 18 into the cooking cavity 16 at a desired level. After placing the food on the rack, the user turns on the flow of gas to a desired pressure using knob 23. Thereupon, as primary air enters through the venturi inlet 30, gas in this embodiment flows from the tank into the orifice 29. The gas mixes with the air and, as noted above, the combination flows into the input of the burner 27 from the output of the venturi 28. The air and gas mixture proceeds into the enclosed burner 27, substantially sealed but for the combustible media at the bottom of the burner. The combustible media 50, ceramic tiles in this example, is fit at the bottom of burner 27, and it's heat emitting surface is exposed toward cooking cavity 16, providing a downward heat source. The gas enters the enclosed burner 27, and then it flows through tiny holes found in and characteristic of ceramic tiles. The gas/air mixture surrounds the igniter 34 which in one embodiment is proximate to and slightly below the combustion media. The user in this embodiment depresses button 24 and ignites the air and gas mixture. Cooking then commences of the food on rack 18 at the heat level chosen via the seating mechanism 17 of the racks 18.

Combustion results at the surface of the combustion media (here, the tiles) as the air and gas mixture continues to flow through the holes in the ceramic tiles. The infrared process creates unique benefits, but its embodiments within the benefits can often be dramatic. Returning to the burner activity, the exploding gas produces the combustion of flames on the ceramic tiles. At a certain heat the cooking process commences. The hot combustible media begins to generate infrared heat rays at extremely high temperatures. The ceramic tiles proceed to emit radiant heat into the protected cooking cavity 16. Among other purposes, the top wall 31 which forms the top surface of the cooking cavity 16 in this embodiment is used to assist in containing the generated radiant heat within the cooking cavity 16. The radiant energy heats and cooks the food.

As noted above, the combustion media need not be restricted to ceramic tiles. The designer of the grill, for instance, may choose to use another type of appropriate combustion media such as metallic mesh, fiberglass panels or the like.

Ordinarily, in the case where infrared radiation is generated, the temperature of the infrared heat rays will range anywhere from approximately 1500 to 1750 degrees Fahrenheit (possibly more). The temperature is primarily a function of the British Thermal Unit ("BTU") setting of the grill 10. As an illustration of this relationship, the radiant surface in one embodiment may have an average port loading of approximately 300 BTU per hour per square inch of surface area. The infrared heat rays release radiant energy in the wavelength range of approximately two to six microns. The BTU setting in this embodiment is configured for 16,000 BTU/hour. (Of course, these figures are subject to a number of variables and can differ depending on the implementation. As such, the figures are intended to be illustrative approximations rather than restrictive in nature.)

FIG. 3 is a front view of an embodiment of the grill 10 with the burner cover 11 and front window 37 removed for illustrative purposes. A side view of the burner 27 is shown with metallic side front and rear covers 32 and 33. (A perspective view of the burner is shown in FIGS. 7 and 8). The cylindrical venturi 28 portion of the burner can also be seen with the inlet port 30 for the injection of primary air, and orifice 29 for the entry of gas through an appropriate connection (not shown). A controlled gas/air mixture is thereby generated in the venturi 28 and proceeds to flow into the burner 27. As noted above, the flow of the gas into the venturi 29 orifice can be controlled in this embodiment by adjusting knob 23. The end of the igniter (i.e. the point at which the sparks emanate) cannot be seen in this figure (but see FIG. 5, which shows that it is located in that embodiment just below the center of the bottom surface of the burner 27.) The embodiment in FIG. 5 locates a position that will provide optimal combustion within the cooking cavity 16. However, combustion will occur at other locations or positions as long as the spark from the igniter 34 reaches the gas/air mixture and the temperature is above the kindling temperature of the mixture. The igniter (34 in FIG. 5) ignites the gas/air mixture that flows from the venturi 28 into the burner 27, and then from the enclosure through the numerous tiny orifices in the ceramic tiles (or other combustible surface used) at the lower surface of burner 27, inducing combustion thereby causing emission of radiant heat from the surface of the ceramic tiles (50 in FIG. 5).

The shape and size of the venturi 28, inlet port 30, orifice 29, cooking cavity 16, rack 18, and the configuration, width, depth and type of the burner 27 are matters of design choice and may vary widely depending on the implementation. These and other details may be modified significantly from the disclosed embodiments without departing from the claimed invention. As an illustration, it may be desirable in certain circumstances to have reignition capability in the igniter 34 for a particular grill. This type of igniter includes "flame sensing" ability. That is, if the flame is extinguished, the igniter can recognize the termination of the flame and automatically reignite the air/gas mixture. Igniters with reigniting capability are commercially available. The type of igniter is a matter of choice. The location of application as stated above for the igniter is the same regardless of type. In another example, the orifice 29 may be designed using one of a large number of possible sizes. One factor in determining an optimal diameter of the orifice for a gas-driven grill is the type of gas used. As indicated above, natural gas, liquid propane, butane, and others may be used. The diameter of the orifice represents a design parameter that will typically vary to achieve the desired rate and pressure of gas flow, depending on the type of gas utilized and the properties unique to the gas.

Further, the heat source 27 such as the burner can vary significantly in size and shape. The dimensions of the heat source may vary depending upon the application for which the grill 10 will be deployed, as well as the requirements and limitations of various components selected for use in the grill system 10. For instance, where an infrared burner 27 is used, the depth of the burner enclosure may be determined in part by the diameter of the venturi 28. The diameter of the venturi 28, in turn, may be calculated by determining the amount of primary air required to effectuate a clean and safe combustion process. Another important factor in certain embodiments is the primary air to gas ratio, which may be determined by various other calculations or by running tests. The air to gas ratio should be set so that, among other considerations, the flame generated by the combustion process is stable on the combustible medium service of the burner 27—meaning that no excess lifting or flashbacks occur. Another consideration is the generation of flue products. The primary air to gas ratio should be set such that the flame does not generate any flue products above the safety levels.

In simpler embodiments, the required surface area of the combustible media (such as the ceramic tiles (see 50 in FIG. 5) used in the embodiments of FIGS. 2 and 3) may be determined by port loading calculations, where the designer knows the required port loading and BTU that the grill will use. In particular, $$\text{Port Loading}(\text{BTU}/(\text{hour})(\text{in}^2)) = \frac{\text{BTU setting (BTU/hour)}}{\text{Media (in}^2)}$$

Consequently, if the designer has determined the appropriate port loading characteristics and BTU setting for the device, one can ascertain the required surface area of the ceramic tiles to be used in grill 10.

FIG. 7 is an angled view of an embodiment of the grill configured as part of an island 56 with a side wall cut away to show the cooking cavity 16. An island here means a comprehensive set of products such as faucet, sink, warming drawer, etc. While not shown, the venturi 28 extends into control cavity (25 in FIG. 2). Portions of the various segments of top wall 31, as well as a portion of the top rear panel 44 of the rear top wall panel 31c containing vents 43 for the emission of flue products can be seen in FIGS. 5 and 6. A side wall 19 of grill 10 is omitted for ease of viewing. The rack 18 is situated in the cooking cavity 16. As in FIG. 1, vents 12 control the flow of heat on the burner cavity to maintain safety levels. Cool fresh air from the environment enters these vents 12 to cool the burner 27. While being heated by the burner in operation, the air then exit the opening vents 47 in the rear. On one exemplary louver or vent 12, the opening where air enters into the cavity 55 is at the bottom of the vent. A door handle 38 provides for opening of the front door 20 which in this example is manufactured with metal casing. A large window opening 37 enables the user to view the food and monitor the progress of the grilling process. The grill 10 may also contain a light switch (not shown) as well as a suitable lighting mechanism inside cooking cavity 16. Handle 49 represents the handle of a dripping pan (such as pan 40 in FIG. 5) used to collect grease, etc. Using the handle 49, the dripping pan can be removed, cleaned and inserted easily.

FIG. 7 shows an example of one of many possible configurations of the grill 10. FIG. 7 illustrates that the specific configuration of many of the components of the grill 10, from the shape of the door handle 38 to the configuration of the top cover 11. The number and type of vents are design choices that may change depending on the implementation of the grill and are not essential to the invention. What is essential to the claimed invention is the location of the vents and the position of one set of vents in relation to the position of another set of vents. In addition, depending on the grill, details such as the configuration and composition of the side walls and other components, including the size, shape and method of attachment to one another or to the top and bottom of the grill, and others, are further examples of details that often vary depending on the grill. These details, likewise are design choices. In addition, some embodiments do not use a control cavity, which, while a desirable and novel feature, is not the core of the invention.

FIG. 8 shows a drawing of the embodiment of the grill in FIG. 7. The major difference between FIGS. 8 and 7 is that FIG. 8 is not integrated with an island. Rather, it is a stand-alone device. In some embodiments a cart with wheels may be added to the bottom of grill 10 for mobility, such as in outdoor residential settings.

In still another embodiment, the grill 10 may implement a rotisserie grill in lieu of a rack with a seating mechanism. For example, a spit may be located in the cooking cavity with each end on the narrower side walls of the grill. A mechanism for rotating the spit (well known in the art) would be included to rotate the spit, and in turn, the food content secured on the spit. This configuration retains the significant advantages of the embodiments disclosed above while allowing the user to cook food using the rotisserie option. The rotating mechanism, such as a rotating motor, along with its control components, and wiring, may very well be placed inside the control cavity 25, with its on/off button accessible on the control panel 22.

The grill disclosed through the exemplary set of embodiments herein provides significant advantages over existing implementations. A partial list of some of these advantages will be described in the ensuing paragraph. (Numerous other benefits will be apparent to those skilled in the art upon perusal of this disclosure). These benefits solve the shortcomings in existing configurations and address the illustrative disadvantages of traditional grills discussed earlier and, where appropriate for clarity, are referenced in more detail below.

The heat source in the embodiments herein is mounted above the food content in a cooking cavity. This orientation of the heat source over the cooking cavity as disclosed above is significant for many reasons. For one, juice, grease, and other food drippings generated from the cooking process are collected below, such as in a dripping pan or other surface. Because the burner is configured at the top of the cavity, these drippings are highly unlikely to ignite. This configuration is superior to grills having the heat source configured below the cooking area, where drippings commonly result in unwanted flare-ups when the grease catches on fire. Many of these grills employ no protective cavity, exposing the user to a potentially dangerous condition. A large amount of flame can result, which is not only hazardous but can also adversely affect the cooking process when the unwanted flames sear the food item. The cooking cavity disclosed herein, by contrast, provides user protection from drippings even in the highly unlikely event of spurious flames resulting for any reason. As such, the positioning of the burner in the cooking cavity produces less or no flare ups, and protects the user from the heat. Cleaning is easier since the user can simply clean the bottom of the grill surface, or in some embodiments, the user can simply remove a dripping pan for cleaning and then simply reinsert the pan into the grill.

Further, the heat source and cooking cavity described herein provided significant benefits over the many outdoor grills that mount the heat source—such as an infrared burner—below the food content. This traditional arrangement invariably clogs up the burner itself. The severity of the clogging only progresses as the grill use continues. Juice, grease, and other drippings fall and cover the infrared burner upper surface, where the cooking flame otherwise resides. The drippings eventually fall into other parts of the burner. Among other problems with this traditional arrangement, the clogging will eventually dramatically affect—for the worse—the flame characteristics of the infrared burner. Port loading is adversely effected and changes unpredictably. Emission worsens. Heating characteristics are effected, often unpredictably so. The result is undesirable emission characteristics during the cooking process, and uneven hot spots. Hot spots can be produced by portions of the infrared burner being more clogged than other portions. Thus, heat radiated from the less-clogged portions is more powerful, while heat radiated from the more-clogged emissions is less powerful or even clogged to the point where those portions of the burner are rendered inoperable for all practical purposes. In effect, upon continued use of the grill, the user loses control over the cooking process. The heat source mounted at the top of the cavity 16 in the above embodiments of this disclosure eliminates this problem. Further, the life of the heat source is likely to be much greater because the source is exposed to much less unwanted by-products of grilling.

The benefits of the embodiments herein apply equally to the situation where the cooking cavity of the grill in this disclosure is configured with a rotisserie in the cooking cavity. The rotisserie method is in lieu of a rack arrangement, as noted above. Rotisserie arrangements, which cook food on a rotating rod or spit, are used in some situations because they provide some different cooking characteristics that may occasionally be desired for certain cooking applications, These characteristics depend on a wide variety of well-known circumstances not pertinent to this disclosure. (As noted, the use of a rotisserie is known in the art and the details and properties consequently need not be discussed at length here, except as mentioned above in the illustration of the positioning of the spit in the cooking cavity).

In the existing rotisserie arrangements of which the inventors are aware, an infrared burner is mounted vertically at the rear of the grill. The burner is located above the grilling surface and behind the food on the spit. The combustible surface of the burner faces forward to provide radiant heat towards the rotating food on the spit. This traditional arrangement, unfortunately, has problems, not the least of which is the fact that the opened and intensely hot infrared flame is exposed forward and directly towards the user. High temperatures and flue products can easily contact the user standing in front of the grill or tending to the rotating food. Obviously, this prior implementation can be unsafe and result in injury. Further, any delayed ignition of the burner may cause a burst of flame to move in the user's direction, producing a potential fire hazard and creating an unfortunate condition for a person at the front of the grill.

By contrast, the embodiments disclosed herein have the heat source (e.g., infrared burner) mounted above at an angle on an inclined proximal top wall facing the food and away from the user. The radiant heat from the burner is directed downward at the rotisserie, rather than at the user. Thus, unpredictable flames or flue products move in a direction away from the user, even when the user has opened the door of the grill. The cooking cavity provides comprehensive protection from unpredictable or unexpected occurrences of flame. The safety problems with the rotisserie prior art mechanism are effectively eliminated.

Another advantage of the embodiments herein is that the mounting of the heat source above the food can substantially enhance the flavor of the resulting cooked food item. More specifically, the mounting of the burner above the food content on the rack generates juice on the surface of the food. Rather than the juice flowing down and away from the food, the juice remains within, and is effectively sealed inside, the food. The flavor differences in the end product can be significant.

As noted above, traditional grills with heat sources (e.g., infrared burners or regular tubular burners) located below the rack containing the food, the heat source will likewise generate juice from the food product. Unfortunately, the juice is generated on the bottom, rather than top, surface of the food. Rather than being absorbed and maintained in the food, the generated juice simply drips out of the bottom of the food. The resulting cooked food item, being deprived of flavor-enhancing juices, can be too dry and inferior in taste.

The multiple shelf arrangement discussed in connection with various embodiments allows the user to adjust the cooking temperature as deemed appropriate by doing nothing more than lowering and raising the food on the rack.

The top mounted heat source provides numerous other benefits, many of which will be apparent to those skilled in the art upon review of the present disclosure. The benefits can be subtle yet highly useful for the user. For example, the top mounted heat source can be used for cheesemelting purposes. The retention of heat within a cooking cavity results in a safer grill. The retained heat maintains efficiency during the cooking process and can enhance the cooking process itself by maintaining a relatively constant heat level around the food item. A fan can also be situated in the cooking cavity to ensure even distribution of the heat and hence, even, controlled grilling. Further, where desired, alternative heat sources may be deployed, such as a tubular burner. Likewise, the control cavity keeps the heat away from sensitive grill components. The size, shape and orientation of the cooking-cavity, burner, and other components can be selected to suit the intended application.

Most critical, the unique and calculated orientation of the angles of the top wall and burner surface, as in the embodiments shown in FIGS. 2, 4, 5, 5A, 7 and 8, promote the flow of heat and flue products in a direction away from the front of the grill without taking away the efficiency of the grill to cook the food item. Also, the angled orientation of the top surface, as earlier noted, helps prevent the emission of heat at the user when the grill door is opened, resulting in a more comfortable cooking process. The top wall configuration coupled with the uniquely vented burner cavity makes an overall efficient but safe grill.

Further, the enclosed cooking cavity retains the high temperatures and produces small and controlled amounts of heat emission from known louvers or vents. The grill as disclosed herein can be optimal for attachment above a refrigerator unit, such as in a residential outdoor application. The refrigerator unit may be configured below the grill, for example, and may contain items like barbecue sauce, and the food items to be cooked. Side panels or drawers can be added for utensils, towels, seasonings and the like. In addition to rotisserie and fan, a mechanism capable of spraying steam can also be incorporated into the grill, inside the control cavity. By spraying heated steam/vapor into the cooking cavity, the grill can now function as a steamer, in addition to broiling, searing, and baking. The sprayer can also spray solutions or suspensions of juices or seasoning materials for added flavoring. Heated steam, vapor, solutions, and suspensions are collectively referred to as liquid. The spraying process can easily be accomplished with a spray nozzle or head introduced at the interior of the cooking cavity at any of the side walls. The spray nozzle is connecter to a liquid source, the latter preferably stored in a pressurized tank for easy introduction of the liquid into the cooking cavity by mere opening of a valve preferably located outside of the grill or inside the control cavity depending on the size. When the liquid enters a heated cooking cavity, the liquid turns into vapor thereby steaming the contents within the cooking cavity such as the food item. The possibilities of the novel grill herein are limited only by the imagination.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A grill for cooking, comprising:
a cooking cavity of varying shapes having a top wall, a bottom floor and side walls;
a heat source mounted on the top wall for emitting radiant heat downwards toward the bottom floor, the heat source including a combustible surface continuously extending an angled proximal surface of the top wall facing towards the cooking cavity, the combustible surface situating at a distance from a front side wall to allow escape of flue gases but prevent overheating of the side walls, bottom floor, and surrounding areas of the grill;
a burner cavity housing the heat source, the burner cavity having a burner cover including a front, top and rear portion, the front portion having vents lower in position than vents on the rear portion of the burner cover to allow escape of hot air thereby cooling the burner cavity and the grill; and,
an access means to the cooking cavity.

2. The grill of claim 1 wherein the proximal surface of the top wall is angled between about 15 to about 50 degrees facing the cooking cavity.

3. The grill of claim 1 wherein the proximal surface of the top wall is angled between 30 to 45 degrees facing the cooking cavity.

4. The grill of claim 1 wherein the combustible surface is at a distance from the front side wall of about one inch to about four inches.

5. The grill of claim 1 wherein the combustible surface is at a distance from the front side wall of one inch to three inches when the proximal surface of the top wall is angled between 30 to 45 degrees facing the cooking cavity.

6. The grill of claim 1 wherein the combustible surface aligns and fits into the top wall through a cut out on the top wall thereby continuously extending the angled proximal surface of the top wall and consequently tilting the heat source at an angle causing a front edge of the heat source to be below a back edge of the heat source.

7. The grill of claim 1 wherein the top wall has an arching surface facing the cooking cavity, the angled proximal surface of the top wall lower than the rear top wall.

8. The grill of claim 7 wherein the arching can be continuous or segmented.

9. The grill of claim 1 wherein a top rear panel of the top wall have vents uncovered by the burner cover to allow smooth exit of flue products and other byproducts of the cooking process.

10. The grill of claim 1 wherein the access means is an open space.

11. The grill of claim 1 further comprising a viewport on a stationary wall of the grill.

12. The grill of claim 11 wherein the viewport is slidable in and out of the stationary wall.

13. The grill of claim 1 further comprising a rack configured for placement into the cooking cavity, the rack having a seating mechanism allowing the rack to be raised or lowered relative to the heat source to avoid a need for readjusting a setting of the heat source.

14. The grill of claim 13 wherein a rotisserie is substituted for the rack.

15. The grill of claim 1 wherein the heat source is gas or non-gas driven.

16. The grill of claim 1 wherein the grill is part of an island or is portable.

17. The grill of claim 1 further comprising a control cavity to protect control components and portions of a venturi coupled to the heat source from adverse conditions and by-products generated in the cooking cavity, thereby ensuring proper functioning.

18. The grill of claim 17 wherein the venturi comprises an orifice having a diameter able to take different types of gases.

19. The grill of claim 1 further comprising a drip pan to collect drippings generated by the cooking process.

20. The grill of claim 1 wherein, the heat source is turned on by an igniter.

21. The grill of claim 20 wherein the igniter has reigniting ability.

22. The grill of claim 1 further comprising a spray nozzle mounted on a side wall, the spray nozzle connected to a pressurized tank having a valve for controlling delivery of a liquid into the cooking cavity, the liquid transforming into steam for steaming contents within the cooking cavity.

23. The grill of claim 1 wherein the access means is a door, the door with or without a window.

24. The grill of claim 23 wherein the window is slidable in and out of the door.

25. The grill of claim 23 wherein the door can slide or tuck into a bottom portion of the grill after opening, at a location parallel to the bottom wall to allow easier access to the cooking area.

26. The grill of claim 1 further comprising components for the grill, the components including panels, divider walls, insulation, insulator cover, and vents.

27. A grill for cooking, comprising:
a cooking cavity of varying shapes having a top wall, side walls, a bottom floor and a front panel including an access means to the cooking cavity;
a slidable viewport on the front panel or side walls;
a heat source mounted on the top wall for emitting radiant heat downwards toward the bottom floor, the heat source including a combustible surface continuously extending an angled proximal surface of the top wall facing towards the cooking cavity, the combustible surface situating at a distance from the front panel to allow escape of flue gases but prevent overheating of the side walls, bottom floor, front panel and surrounding areas of the grill;
a rack configured for placement in the cooking cavity; and,
a burner cavity housing the heat source, the burner cavity having a burner cover including a front, top and rear portion, the front portion having vents lower in position than vents on the rear portion of the burner cover to allow escape of hot air thereby cooling the burner cavity and the grill within safety level.

28. A multi-faceted grill for cooking, comprising:
a cooking cavity of varying shapes having an arching top wall including an angled proximal top surface and a rear top surface, side walls, a bottom floor and a front panel including an access means to the cooking cavity;
a heat source mounted on the top wall for emitting radiant heat downwards toward the bottom floor, the heat source including a combustible surface aligning and fitting into the top wall through a cut out on the top wall to continuously extend an angled proximal surface of the top wall of approximately 15–50 degrees facing towards the cooking cavity, the combustible surface situating at a distance from the front panel of approximately 1–4 inches to allow escape of flue gases but prevent overheating of the side walls, bottom floor, front panel and surrounding areas of the grill;
a rack configured for placement in the cooking cavity; and,
a burner cavity housing the heat source, the burner cavity having a burner cover including a front, top and rear portion, the front portion having vents lower in position than vents on the rear portion of the burner cover to allow escape of hot air thereby cooling the burner cavity and the grill within safety level.

29. The multi-faceted grill of claim 28 wherein the angle of the proximal top surface of the top wall is between 30 to 45 degrees facing the cooking cavity.

30. The multi-faceted grill of claim 28 wherein the combustible surface is at a distance from the front panel of one inch to three inches when the proximal top surface of the top wall is angled between 30 to 45 degrees facing the cooking cavity.

* * * * *